United States Patent
Kim et al.

(10) Patent No.: US 11,444,280 B2
(45) Date of Patent: *Sep. 13, 2022

(54) NICKEL-BASED ACTIVE MATERIAL PRECURSOR FOR LITHIUM SECONDARY BATTERY, PREPARATION METHOD THEREOF, NICKEL-BASED ACTIVE MATERIAL FOR LITHIUM SECONDARY BATTERY FORMED THEREFROM, AND LITHIUM SECONDARY BATTERY INCLUDING CATHODE INCLUDING THE NICKEL-BASED ACTIVE MATERIAL

(71) Applicant: Samsung SDI Co., Ltd., Yongin-si (KR)

(72) Inventors: Doyu Kim, Yongin-si (KR); Wooyoung Yang, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 31 days.

This patent is subject to a terminal disclaimer.

(21) Appl. No.: 16/539,768

(22) Filed: Aug. 13, 2019

(65) Prior Publication Data

US 2020/0058937 A1 Feb. 20, 2020

(30) Foreign Application Priority Data

Aug. 14, 2018 (KR) .......................... 10-2018-0094866
Aug. 9, 2019 (KR) .......................... 10-2019-0097644

(51) Int. Cl.
*H01M 4/525* (2010.01)
*H01M 4/505* (2010.01)
(Continued)

(52) U.S. Cl.
CPC .......... *H01M 4/525* (2013.01); *H01M 4/366* (2013.01); *H01M 4/505* (2013.01); *H01M 10/0525* (2013.01); *H01M 2004/028* (2013.01)

(58) Field of Classification Search
CPC .. H01M 4/505; H01M 4/525; H01M 10/0525; H01M 2004/028; H01M 4/366
See application file for complete search history.

(56) References Cited

U.S. PATENT DOCUMENTS 8,728,666 B2   5/2014   Itou et al.
9,567,238 B2   2/2017   Kawanaka et al.
(Continued)

FOREIGN PATENT DOCUMENTS

CN   102315447 A   1/2012
CN   105024063 A   11/2015
(Continued)

OTHER PUBLICATIONS

Lin, Wenyuan et al., "Facile synthesis of hierarchical porous Ni-rich LiNi0.6Co0.2Mn0.2O2 cathode material with superior high-rate capability," Ionics, vol. 22, 2016, 10 pages.
(Continued)

*Primary Examiner* — Carlos Barcena
(74) *Attorney, Agent, or Firm* — Lewis Roca Rothgerber Christie LLP

(57) ABSTRACT

Provided is a nickel-based active material precursor for a lithium secondary battery, including: a secondary particle including a plurality of particulate structures, wherein each of the particulate structures includes a porous core portion and a shell portion including primary particles radially arranged on the porous core portion, and in 50% or more of the primary particles constituting a surface of the secondary particle, a major axis of each of the primary particles is aligned along a normal direction of the surface of the
(Continued)

secondary particle. When the nickel-based active material precursor for a lithium secondary battery is used, it is possible to obtain a nickel-based active material which intercalates and deintercalates lithium and has a short diffusion distance of lithium ions.

10 Claims, 6 Drawing Sheets

(51) Int. Cl.
    *H01M 4/36*     (2006.01)
    *H01M 10/0525*     (2010.01)
    *H01M 4/02*     (2006.01)

(56) References Cited

U.S. PATENT DOCUMENTS

| | | | |
|---|---|---|---|
| 10,581,110 B2 | 3/2020 | Kwon et al. | |
| 2003/0164674 A1 | 9/2003 | Imamura | |
| 2009/0029253 A1* | 1/2009 | Itou | H01M 10/0525 429/223 |
| 2012/0009474 A1 | 1/2012 | Yanagihara et al. | |
| 2016/0049647 A1* | 2/2016 | Park | H01M 4/131 429/209 |
| 2016/0181597 A1 | 6/2016 | Kim et al. | |
| 2017/0222221 A1 | 8/2017 | Park et al. | |
| 2017/0324091 A1* | 11/2017 | Hasegawa | C01G 53/50 |
| 2017/0324092 A1* | 11/2017 | Yoshida | C01G 53/006 |
| 2018/0013129 A1 | 1/2018 | Lee et al. | |
| 2018/0048015 A1 | 2/2018 | Lee et al. | |
| 2018/0108940 A1 | 4/2018 | Kwon et al. | |
| 2018/0151876 A1 | 5/2018 | Kim et al. | |
| 2018/0159128 A1 | 6/2018 | Kim et al. | |
| 2018/0212237 A1 | 7/2018 | Lee et al. | |
| 2019/0148721 A1 | 5/2019 | Park et al. | |
| 2019/0260024 A1* | 8/2019 | Nakamura | H01M 4/505 |
| 2019/0326596 A1 | 10/2019 | Yun et al. | |
| 2019/0393502 A1 | 12/2019 | Yun et al. | |
| 2020/0083530 A1 | 3/2020 | Yun et al. | |
| 2020/0119351 A1 | 4/2020 | Yun et al. | |

FOREIGN PATENT DOCUMENTS

| | | |
|---|---|---|
| CN | 107004852 A | 8/2017 |
| CN | 107534140 A | 1/2018 |
| CN | 107644982 A | 1/2018 |
| CN | 107742720 A | 2/2018 |
| CN | 108028369 A | 5/2018 |
| CN | 108155357 A | 6/2018 |
| CN | 110642302 A | 1/2020 |
| EP | 3331066 A1 | 6/2018 |
| EP | 3550640 A1 | 10/2019 |
| EP | 3588632 A1 | 1/2020 |
| JP | 2015-72800 A | 4/2015 |
| JP | 2017-533568 A | 11/2017 |
| JP | 2018-500720 A | 1/2018 |
| JP | 2018-506156 A | 3/2018 |
| JP | 2018-092931 | 6/2018 |
| JP | 2018-515884 A | 6/2018 |
| JP | 2018-521456 A | 8/2018 |
| KR | 10-2007-0116158 A | 12/2007 |
| KR | 10-2010-0099337 A | 9/2010 |
| KR | 10-2013-0138073 A | 12/2013 |
| KR | 10-2015-0095428 A | 8/2015 |
| KR | 10-2016-0129764 A | 11/2016 |
| KR | 10-2018-0063849 A | 6/2018 |
| KR | 10-2020-0042868 A | 4/2020 | |
| WO | WO-2017150945 A1 * | 9/2017 ........... C01G 53/006 |
| WO | 2018/101809 A1 | 6/2018 |
| WO | WO 2018/101806 A1 | 6/2018 |
| WO | WO 2018/101807 A1 | 6/2018 |
| WO | WO 2018/101808 A1 | 6/2018 |
| WO | WO 2018/105945 A2 | 6/2018 |

OTHER PUBLICATIONS

EPO Extended Search Report dated Nov. 11, 2019, for corresponding European Patent Application No. 19191446.4 (7 pages).
EP Office Action dated May 19, 2021 for corresponding EP Application No. 19191446.4 (5 pages).
JP Notice of Allowance dated Mar. 22, 2021 for corresponding JP Application No. 2019-148833 (3 pages).
Extended European Search Report for European Patent Application No. 19182526.4, dated Sep. 23, 2019, 9 pages.
Japanese Office Action dated May 25, 2020, issued in Japanese Patent Application No. 2019-118515 (6 pages).
European Patent Office Action for European Patent Application No. 19 182 526.4, dated Aug. 12, 2020, 7 pages.
Korean Intellectual Property Office Action for Korean Patent Application No. 10-2018-0073588, dated Jul. 1, 2020, 7 pages.
U.S. Office Action dated Jan. 7, 2021, issued in U.S. Appl. No. 16/452,282 (10 pages).
U.S. Office Action dated Jun. 18, 2021, issued in U.S. Appl. No. 16/452,282 (11 pages).
U.S. Final Office Action dated Dec. 21, 2021, issued in U.S. Appl. No. 16/452,282 (12 pages).
Chinese Office Action, with English translation, dated Sep. 24, 2021, issued in corresponding Chinese Patent Application No. 201910747827.1 (26 pages).
Chinese Office Action, with English translation, dated Sep. 30, 2021, issued in corresponding Chinese Patent Application No. 201910571521.5 (18 pages).
U.S. Office Action from U.S. Appl. No. 16/452,282, dated Mar. 1, 2022, 3 pages.
Chinese Office Action, with English translation, dated Apr. 29, 2022, issued in Chinese Patent Application No. 201910571521.5 (15 pages).
U.S. Office Action dated May 25, 2022, issued in U.S. Appl. No. 16/452,282 (12 pages).

* cited by examiner

NICKEL-BASED ACTIVE MATERIAL PRECURSOR FOR LITHIUM SECONDARY BATTERY, PREPARATION METHOD THEREOF, NICKEL-BASED ACTIVE MATERIAL FOR LITHIUM SECONDARY BATTERY FORMED THEREFROM, AND LITHIUM SECONDARY BATTERY INCLUDING CATHODE INCLUDING THE NICKEL-BASED ACTIVE MATERIAL

CROSS-REFERENCE TO RELATED APPLICATION

This application claims priority to and the benefit of Korean Patent Application No. 10-2018-0094866, filed on Aug. 14, 2018 and Korean Patent Application No. 10-2019-0097644, filed on Aug. 9, 2019, in the Korean Intellectual Property Office, the entire content of each of which is incorporated herein by reference.

BACKGROUND

1. Field

Embodiments of the present disclosure relate to a nickel-based active material precursor for a lithium secondary battery, a preparation method thereof, a nickel-based active material for a lithium secondary battery formed therefrom, and a lithium secondary battery including a cathode including the nickel-based active material.

2. Description of the Related Art

With the development of portable electronic appliances, communication appliances, and the like, there is a great need for the development of a lithium secondary battery having high energy density. However, lithium secondary batteries having high energy density need to be improved because they may have poor safety. As a cathode active material of a lithium secondary battery, a lithium-nickel-manganese-cobalt composite oxide, a lithium-cobalt oxide, or the like is used. However, when such a cathode active material is used, the movement distance of lithium ions is determined by the secondary particle size during charging and discharging, and the efficiency of charging and discharging is not sufficiently high due to such physical distance. Further, due to cracks occurring in primary particles due to repeated charging and discharging of a lithium secondary battery, the lifetime of the lithium secondary battery is reduced, the resistance thereof is increased, and the capacity characteristics thereof does not reach a satisfactory level. Therefore, improvement in these respects is beneficial.

SUMMARY

An aspect of an embodiment of the present disclosure provides a nickel-based active material precursor for a lithium secondary battery having improved lithium ion utilization.

Another aspect of an embodiment of the present disclosure provides a method of preparing the nickel-based active material precursor.

Another aspect of an embodiment of the present disclosure provides a nickel-based cathode active material obtained from the nickel-based active material precursor, and a lithium secondary battery including a cathode including the nickel-based cathode active material.

Additional aspects of embodiments will be set forth in part in the description which follows and, in part, will be apparent from the description, or may be learned by practice of the presented embodiments.

According to an aspect of an embodiment, provided is a nickel-based active material precursor for a lithium secondary battery including: a secondary particle including a plurality of particulate structures, wherein each of the particulate structures includes a porous core portion and a shell portion including primary particles radially arranged on the porous core portion, and in 50% or more of the primary particles constituting a surface of the secondary particle, a major axis of each of the primary particles is aligned along a normal direction of the surface of the secondary particle.

According to an aspect of another embodiment, provided is a method of preparing a nickel-based active material precursor for a lithium secondary battery, the method including: a first supplying a feedstock at a first feed rate and stirring the feedstock to form a precursor seed; a second supplying the feedstock to the precursor seed at a second feed rate and stirring the feedstock to grow the precursor seed; and a third supplying the feedstock to the precursor seed at a third feed rate and stirring the feedstock to adjust the growth of the precursor seed, wherein the feedstock includes a complexing agent, a pH adjusting agent, and a metal raw material for the nickel-based active material precursor, and the second feed rate of the feedstock for the nickel-based active material precursor is greater than the first feed rate thereof, and the third feed rate thereof is greater than the second feed rate thereof.

According to an aspect of another embodiment, there is provided a nickel-based active material for a lithium secondary battery, obtained from the nickel-based active material precursor.

According to an aspect of another embodiment, there is provided a lithium secondary battery comprising: a cathode including the nickel-based active material; an anode; and an electrolyte between the cathode and the anode.

BRIEF DESCRIPTION OF THE DRAWINGS

These and/or other aspects of embodiments of the present disclosure will become apparent and more readily appreciated from the following description of the embodiments, taken in conjunction with the accompanying drawings in which.

DETAILED DESCRIPTION

Figure 1:
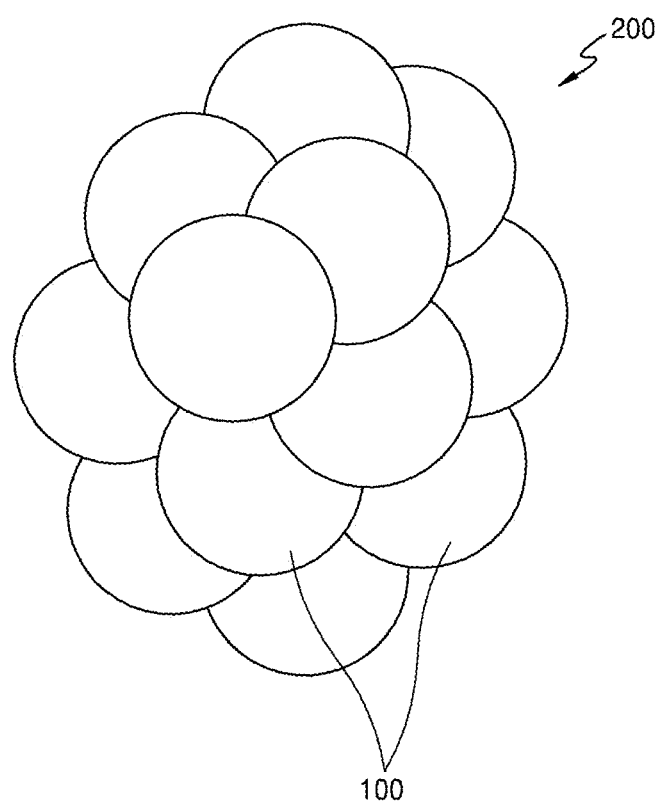
FIG. 1 is a schematic view of a secondary particle included in a nickel-based active material precursor according to an embodiment.

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of embodiments of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a nickel-based active material precursor for a lithium secondary battery according to an embodiment, a preparation method thereof, a nickel-based active material for a lithium secondary battery formed therefrom, and a lithium secondary battery including a cathode including the nickel-based active material will be described in more detail. The following description is presented as an example, and the present disclosure is not limited thereto. The present disclosure is only defined by the scope of the appended claims, and equivalents thereof.

As used herein, the term "particulate structure" refers to a structure formed by the aggregation of a plurality of primary particles.

As used herein, the term "isotropic arrangement" refers to an arrangement in which the properties of an object do not change even when the direction in which the object is observed is changed, and an arrangement in which directionality is not observed.

As used herein, the term "multi-center" means that one particle has a plurality of centers, for example, 2 to 10 centers. In the multi-center particle, the movement length of lithium ions from the surface of the particle to the center of the particle is reduced. Because the movement length of lithium ions is reduced, a particulate structure in which internal resistance is reduced and charge-discharge efficiency and long lifetime are improved is obtained.

Figure 2A:
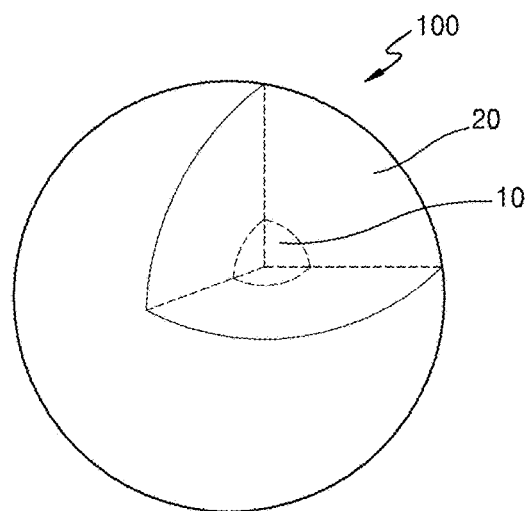
FIG. 2A is a schematic partial perspective view of a particulate structure included in the secondary particle of FIG. 1.
Figure 2B:
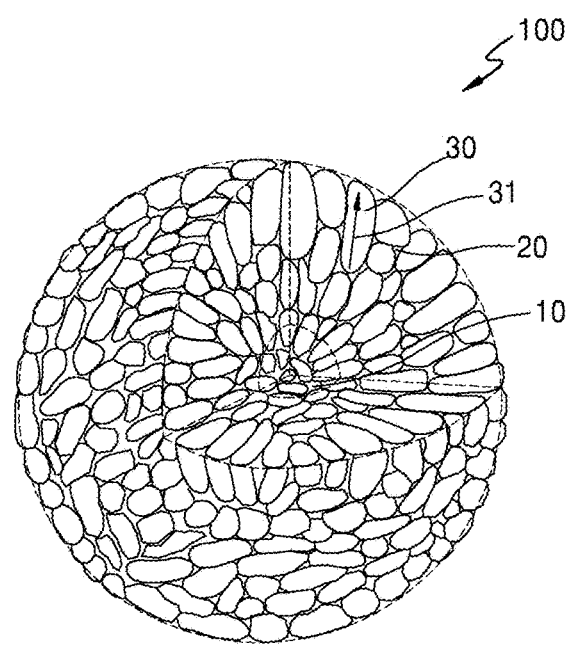
FIG. 2B is a more detailed partial perspective view of a particulate structure included in the secondary particle of FIG. 1.

As used herein, the term "radial center" refers to a center of a particulate structure including a porous core portion and a shell portion including primary particles radially arranged on the porous core portion (e.g., on or directly on the porous core portion), as shown in FIGS. 2A and 2B.

As used herein, the term "radial shape" refers to a shape in which the major axes of primary particles included in the shell portion are arranged in a normal direction of the surface of the particulate structure or in a direction inclined from the normal direction by an angle of ±30° (e.g., ±30° or less). As used herein, the term "normal direction" refers to a direction that is perpendicular (e.g., substantially perpendicular) to the referenced feature. For example, as used herein the term "normal direction of the surface" may refer to a direction that is perpendicular (e.g., substantially perpendicular) to the referenced surface.

As used herein, the term "particle size" refers to an average particle diameter in the case of spherical particles, and refers to an average major axis length in the case of non-spherical particles. The average diameter is the mean particle diameter (D50), which is defined as the particle diameter corresponding to the cumulative diameter distribution at 50% (e.g., 50 wt %), which represents the particle diameter below which 50% (e.g., 50 wt %) of the sample lies. The particle size may be measured using a particle size analyzer (PSA).

As used herein, the term "pore size" refers to an average pore diameter or an average opening width in the case of spherical or circular pores. The pore size refers to an average major axis length in the case of non-spherical or non-circular pores such as elliptical pores.

As used herein, the term "irregular pores" refers to pores which are not regular in pore size and pore shape and do not have uniformity. The core portion including irregular pores, unlike the shell portion, may include amorphous particles, and the amorphous particles may be arranged without regularity, unlike the shell portion.

In the following drawings, like reference numerals refer to like elements, and the size of each element in the drawings may be exaggerated for clarity and convenience of explanation. Further, embodiments to be described below are merely illustrative, and these embodiments may be variously modified. Further, in the layer structure to be described below, the expressions "over" and "on" include not only being directly on with contact but also being over without contact.

The nickel-based active material precursor for a lithium secondary battery according to an embodiment includes: a secondary particle including a plurality of particulate structures, wherein each of the particulate structures includes a porous core portion and a shell portion including primary particles radially arranged on the porous core portion, and in 50% or more (e.g., 50 wt % or more based on 100 wt % of the primary particles) of the primary particles constituting a surface of the secondary particle, a major axis of each of the primary particles is aligned along the normal direction of the surface of the secondary particle.

Figure 3:
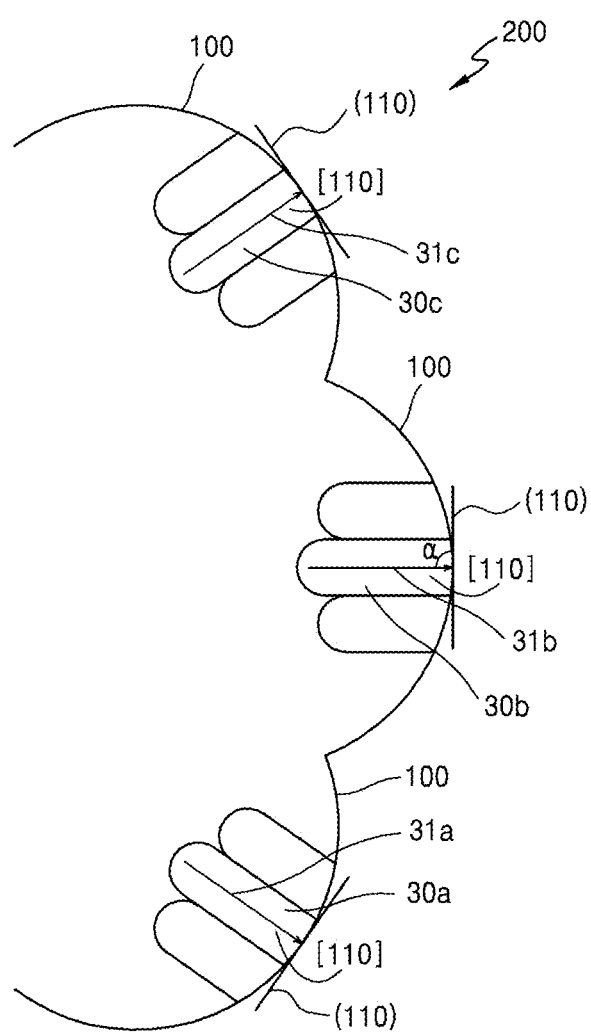
FIG. 3 is a schematic cross-sectional view of the surface and vicinity thereof of the secondary particle included in the nickel-based active material precursor according to an embodiment.

Referring to FIG. 1, the nickel-based active material precursor includes a secondary particle 200 including a plurality of particulate structures 100. Referring to FIGS. 2A and 2B, the particulate structure 100 includes a porous core portion 10 and a shell portion 20 including primary particles 30 radially arranged on the porous core portion 10. Referring to FIG. 3, in 50% or more (e.g., 50 wt % or more based on 100 wt % of the primary particles) of the primary particles 30a, 30b, and 30c constituting the surface of the secondary particle including the plurality of particulate structures 100, the major axes 31, 31a, 31b, and 31c of the primary particles are aligned along the normal direction of the surface of the secondary particle. For example, in 50% or more of the primary particles 30a, 30b, and 30c constituting the surface of the secondary particle 200 including the plurality of particulate structures 100, the major axes 31, 31a, 31b, and 31c of the primary particles are arranged at an angle (a) of 90° with respect to the surface of the secondary particle 200.

Referring to FIGS. 2A, 2B, and 3, because the secondary particle 200 is an assembly of the plurality of particulate structures 100, the diffusion distance of lithium ions during charging and discharging is reduced as compared with an existing secondary particle including one particulate structure. The core portion 10 of the particulate structure 100 is porous, and the primary particles 30 are radially arranged on the core portion 10 to form the shell portion, thereby effectively accommodating the volume change of the primary particles 30 during charging and discharging. Therefore, the cracking of the secondary particles 200 due to the volume change of the secondary particle 200 during charging and discharging is prevented or reduced. The (110) crystal plane of the primary particle 30 is a crystal plane where lithium ions are injected into and discharged from the nickel-based active material obtained from the nickel-based active material precursor having a layered crystal structure. When the major axes 31, 31a, 31b, and 31c of the primary particles constituting the surface of the secondary particle are aligned along the normal direction of the surface of the secondary particle, the diffusion of lithium ions on the interface between the electrolyte and the nickel-based active material obtained from the nickel-based active material precursor is easy (e.g., is improved), and the diffusion of lithium ions into the nickel-based active material obtained from the nickel-based active material precursor is also easy (e.g., is improved). Therefore, the use of lithium ions in the nickel-based active material obtained from the nickel-based active material precursor including such a secondary particle 200 further increases.

Referring to FIGS. 2A and 2B, the "shell portion 20" refers to a region of 30 length % to 50 length %, for example, 40 length % from the outermost of the particulate structure 100 in the total distance from the center of the particulate structure 100 to the surface thereof, or refers to a region within 2 μm from the surface of the particulate structure 100. The "core portion 10" refers to a region of 50 length % to 70 length %, for example, 60 length % from the center of the particulate structure 100 in the total distance from the center of the particulate structure 100 to the outermost thereof, or refers to a region except for that within 2 μm from the surface of the particulate structure 100. The center of the particulate structure 100 is, for example, a geometrical center of the particulate structure 100. Although it is shown in FIGS. 2A and 2B that the particulate structure 100 has a complete particle shape, the secondary particle 200 of FIG. 1 obtained by assembling the plurality of particulate structures 100 has a partial particle shape because some of the particulate structures 100 overlap the others of the particulate structures 100. For example, while the particulate structure 100 shown in FIGS. 2A and 2B has a distinct particle shape, the particulate structures 100 of the secondary particle 200 may be combined together such that the particulate structures 100 are not all fully distinct from one another and/or the secondary particle 200 may have an amorphous shape.

Referring to FIGS. 2B and 3, in an example of the secondary particle 200, the content (amount) of the primary particles 30, 30a, 30b, and 30c whose major axes are aligned along the normal direction of the surface of the secondary particle 200 is about 50% to about 95%, about 50% to about 90%, about 55% to about 85%, about 60% to about 80%, about 65% to about 80%, or about 70% to about 80% with respect to the total content (e.g., wt % with respect to the total weight) of the primary particles 30, 30a, 30b, and 30c constituting the surface of the secondary particle 200. In the nickel-based active material precursor including the secondary particle 200 having the foregoing content range of the primary particles 30, the use of lithium ions is easier (e.g., the diffusion distance of lithium ions is improved). Further, referring to FIGS. 2A, 2B and 3, in an example of the secondary particle 200, the content (amount) of the primary particles 30, 30a, 30b, and 30c whose major axes are aligned along the normal direction of the surface of the secondary particle 200 is about 50% to about 95%, about 50% to about 90%, about 55% to about 85%, about 60% to about 80%, about 65% to about 80%, or about 70% to about 80% with respect to the total content (e.g., wt % with respect to the total weight) of the primary particles 30, 30a, 30b, and 30c constituting the shell portion 20 of the secondary particle 200.

Referring to FIGS. 2B and 3, one exemplary primary particle 30, 30a, 30b, or 30c is a non-spherical particle having a minor axis and a major axis. The minor axis is an axis connecting the points at which the distance between both ends of the primary particle 30, 30a, 30b, or 30c is the smallest, and the major axis is an axis connecting the points at which the distance between both ends of the primary particle 30, 30a, 30b, or 30c is the largest. The ratio of the minor axis to the major axis of the primary particle 30, 30a, 30b, or 30c may be, for example, 1:2 to 1:20, 1:3 to 1:20, or 1:5 to 1:15. When the ratio of the minor axis to the major axis of the primary particle 30, 30a, 30b, or 30c is within the foregoing range, the use of lithium ions in the nickel-based active material obtained from the nickel-based active material precursor is easier (e.g., is improved).

Referring to FIGS. 2B and 3, the primary particle 30, 30a, 30b, or 30c includes a plate particle as a non-spherical particle. The plate particle is a particle having two surfaces (e.g., two opposing surfaces) spaced apart from each other and facing away from each other (e.g., opposite of each other). A length of the surface (e.g., a surface length) of the plate particle is greater than a thickness of the plate particle, which is a thickness between the two surfaces. The length of the surface of the plate particle is a larger one of two lengths (e.g., two orthogonal lengths) defining the surface. The two lengths defining the surface of the plate particle are the same as or different from each other, and are greater than the thickness of the plate particle. The thickness of the plate particle is a length of the minor axis, and the length of the surface of the plate particle is a length of the major axis. The shape of the surface of the plate particle may be a polygon such as, for example, a trigon, a tetragon, a pentagon, or a hexagon, a circle, or an ellipse, but the present disclosure is not limited thereto. Any suitable particle shape used in the art may be used. The plate particles may include, for example, nanodisks, rectangular nanosheets, pentagonal nanosheets, and/or hexagonal nanosheets. The shape of the plate particles depends on the conditions under which the secondary particles are produced. The two opposing surfaces of the plate particle may not be parallel to each other, the angle between the surface and a side surface of the plate particle may be variously changed, the edges of the surface and side surface of the plate particle may be rounded, and each of the surface and the side surface of the plate particle may be planar or curved. A ratio of the thickness to the length (e.g., surface length) of the plate particle may be, for example, 1:2 to 1:20, 1:3 to 1:20, or 1:5 to 1:15. The average thickness of one exemplary plate particle may be about 100 nm to about 250 nm or about 100 nm to about 200 nm, and the average surface length thereof is about 250 nm to about 1100 nm or about 300 nm to about 1000 nm. The average surface length of the plate particles is 2 to 10 times the average thickness thereof. When the plate particle has a thickness, average surface length, and a ratio thereof within the foregoing ranges, it is easier for the plate particles to be arranged radially on the porous core portion, and as a result, the use of lithium ions is easier (e.g., is improved). Further, in the secondary particle 200, the major axes corresponding to the surface length direction of the plate particles, for example, the major axes 31a, 31b, and 31c of the primary particles, are aligned along the normal direction of the surface of the secondary particle 200. When the major axes of the plate particles are arranged in this direction, the crystal plane where the lithium diffusion path is directed toward is the surface of the secondary particle 200 and the injection and discharge of lithium ions is performed on the surface of the secondary particle 200, for example, the (110) crystal plane of the plate particle, which is greatly exposed, and thus, the use of lithium ions in the nickel-based active material precursor including plate particles as the primary particles 30 is easier (e.g., improved). For example, the (110) crystal plane of the plate particles may be perpendicular (e.g., substantially perpendicular) to the major axis of the respective primary particle.

Further, referring to FIGS. 2B and 3, in 50% or more of the primary particles 30, 30a, 30b, and 30c constituting the surface of the secondary particle 200 (e.g., 50 wt % or more based on the total weight of the primary particles), a major axis of each of the primary particles is arranged in a normal direction of the (110) crystal plane of the primary particles 30, 30a, 30b, and 30c constituting the surface of the secondary particle 200. In some embodiments, in 50% or more of the primary particles 30, 30a, 30b, and 30c constituting the surface of the secondary particle 200, the direction of the major axis of each of the primary particles is aligned along direction [110] of FIG. 3 (e.g., a direction perpendicular (e.g., substantially perpendicular) to the (110) crystal plane of the respective plate particles). For example, in 60% to 80% of the primary particles 30, 30a, 30b, and 30c constituting the surface of the secondary particle 200 (e.g., 60 wt % to 80 wt % based on the total weight of the primary particles), a major axis of each of the primary particles is arranged along a normal direction of the (110) crystal plane of the primary particles 30, 30a, 30b, and 30c constituting the surface of the secondary particle 200. In some embodiments, in 60% to 80% of the primary particles 30, 30a, 30b, and 30c constituting the surface of the secondary particle 200, the direction of the major axis of each of the primary particles is aligned along the direction [110] (e.g., a direction perpendicular (e.g., substantially perpendicular) to the (110) crystal plane of the respective plate particles).

Referring to FIGS. 1 and 3, the secondary particle 200 has multiple centers, and includes the plurality of particulate structures 100 arranged in an isotropic array. For example, by having the plurality of particulate structures 100 in the secondary particle 200 as an isotropic array, the diffusion distance from a surface of the secondary particle 200 to a center of the secondary particle 200 does not change as the direction from which the secondary particle 200 is observed. The secondary particle 200 includes the plurality of particulate structures 100, and each of the particulate structures 100 includes a porous core portion 10 corresponding to the center, such that the secondary particle 200 has a plurality of centers. Therefore, in the nickel-based active material obtained from the nickel-based precursor, the lithium movement path from the plurality of centers in the secondary particle 200 to the surface of the secondary particle 200 is reduced. As a result, the use of lithium ions in the nickel-based active material obtained from the nickel-based precursor is easier (e.g., improved). Further, in the nickel-based active material obtained from the nickel-based precursor, the plurality of particulate structures 100 included in the secondary particle 200 have an isotropic arrangement in which the particles are arranged without a certain directionality, and thus, it is possible to uniformly (e.g., substantially uniformly) use lithium ions irrespective of the specific directions in which the secondary particles 200 are arranged. The secondary particle 200 is, for example, a spherical particle or a non-spherical particle depending on the shape of assembly of the plurality of particulate structures 100.

Referring to FIGS. 1 to 3, in the nickel-based active material precursor, the size of the particulate structure 100 is, for example, about 2 μm to about 7 μm, about 3 μm to about 6 μm, about 3 μm to about 5 μm, or about 3 μm to about 4 μm. Because the particulate structure 100 has a size within the foregoing range, the plurality of particulate structures 100 has an isotropic arrangement as a result of the assembling of the particulate structures, and the use of lithium ions in the nickel-based active material obtained from the nickel-based active material precursor is easier (e.g., improved).

Referring to FIG. 1, in the nickel-based active material precursor, the size of the secondary particle 200 is, for example, about 5 μm to about 25 μm or about 8 μm to about 20 μm. Because the secondary particle 200 has a size within the foregoing range, the use of lithium ions in the nickel-based active material obtained from the nickel-based active material precursor is easier (e.g., improved).

Referring to FIGS. 2A and 2B, the pore size of the porous core portion 10 included in the particulate structure 100 may be about 150 nm to about 1 μm, about 150 nm to about 550 nm, or about 200 nm to about 800 nm. Further, the pore size of the shell portion 20 included in the particulate structure 100 may be less than 150 nm, 100 nm or less, or about 20 nm to about 90 nm. The porosity of the porous core portion 10 included in the particulate structure 100 is about 5% to about 15% or about 5% to about 10%. Further, the porosity of the shell portion 20 included in the particulate structure 100 is about 1% to about 5% or about 1% to about 3%. Because the particulate structure 100 has a pore size and porosity within the foregoing ranges, the capacity characteristics of the nickel-based active material obtained from the nickel-based active material precursor are excellent. In an example of the particulate structure 100, the porosity of the shell portion 20 is controlled to be lower than the porosity of the porous core portion 10. For example, the pore size and porosity in the porous core portion 10 are larger than the pore size and porosity in the shell portion 20 and are controlled irregularly as compared to the pore size and porosity in the shell portion 20. When the porosity of the porous core portion 10 and the porosity of the shell portion 20 in the particulate structure 100 satisfy the foregoing ranges and relationships, the density of the shell portion 20 is increased as compared with the density of the porous core portion 10, and thus, the side reaction of the particulate structure 100 and the electrolyte is effectively suppressed or reduced.

In an example of the particulate structure 100, the porous core portion 10 may have closed pores, and the shell portion 20 may have closed pores and/or open pores. The closed pores are difficult to contain an electrolyte, whereas the open pores may more effectively allow the electrolyte to be contained in the pores of the particulate structure 100. Further, the porous core portion of the particulate structure 100 may have irregular pores. The core portion 10 having irregular pores, similarly to the shell portion 20, may include plate particles, and the plate particles of the core portion 10, unlike the plate particles of the shell portion 20, may be arranged without regularity.

The nickel-based active material precursor may be a compound represented by Formula 1 below.

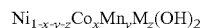

$$Ni_{1-x-y-z}Co_xMn_yM_z(OH)_2 \quad \text{Formula 1}$$

In Formula 1, M is an element selected from boron (B), magnesium (Mg), calcium (Ca), strontium (Sr), barium (Ba), titanium (Ti), vanadium (V), chromium (Cr)), iron (Fe), copper (Cu), zirconium (Zr), and aluminum (Al), and $x \leq (1-x-y-z)$, $y \leq (1-x-y-z)$, $z \leq (1-x-y-z)$, $0 < x < 1$, and $0 \leq y < 1$, $0 \leq z < 1$ are satisfied. In the Formula 1, $0 < 1-x-y-z < 1$ may be satisfied. As described herein above, in the nickel-based active material precursor of Formula 1, the content (amount) of nickel is higher than the content (amount) of cobalt, and the content (amount) of nickel is higher than the content (amount) of manganese. In Formula 1, $0 < x \leq \frac{1}{3}$ may be satisfied, and $0 \leq y \leq 0.5$, $0 \leq z \leq 0.05$, and $\frac{1}{3} \leq (1-x-y-z) \leq 0.95$ may be satisfied.

According to an embodiment, in Formula 1, x may be about 0.1 to about 0.3, y may be about 0.05 to about 0.3, and z may be 0.

Examples of the nickel-based active material precursor may include $Ni_{0.6}Co_{0.2}Mn_{0.2}(OH)_2$, $Ni_{0.7}Co_{0.15}Mn_{0.15}(OH)_2$, $Ni_{0.7}Co_{0.1}Mn_{0.2}(OH)_2$, $Ni_{0.5}Co_{0.2}Mn_{0.3}(OH)_2$, $Ni_{1/3}Co_{1/3}Mn_{1/3}(OH)_2$, $Ni_{0.8}Co_{0.1}Mn_{0.1}(OH)_2$, and $Ni_{0.85}Co_{0.1}Al_{0.05}(OH)_2$.

A method of preparing a nickel-based active material precursor according to another embodiment includes: a first step of supplying a feedstock at a first feed rate and stirring the feedstock to form a precursor seed; a second step of supplying a feedstock to the precursor seed formed in the first step at a second feed rate and stirring the feedstock to grow the precursor seed; and a third step of supplying a feedstock to the precursor seed grown in the second step at a third feed rate and stirring the feedstock to adjust the growth of the precursor seed, wherein the feedstock includes a complexing agent, a pH adjusting agent, and a metal raw material for the nickel-based active material precursor, and the second feed rate of the metal raw material for the nickel-based active material precursor is greater than the first feed rate thereof, and the third feed rate thereof is greater than the second feed rate thereof.

In the first step, the second step, and the third step, the feed rate of the metal raw material is gradually increased, thereby obtaining a nickel-based active material precursor having the aforementioned new structure. In the first step, the second step, and the third step, the reaction temperature is in a range of about 40° C. to about 60° C., the stirring power is in a range of about 0.5 kW/m$^3$ to about 6.0 kW/m$^3$, the pH is in a range of about 10 to about 12, and the content (amount) of the complexing agent in the reaction mixture is in a range of about 0.2 M to 0.8 M, for example, about 0.4 M to 0.7 M, for example, about 0.4 M to 0.6 M. In the foregoing ranges, an nickel-based active material precursor that more closely matches the aforementioned structure may be obtained.

In the first step, the metal raw material and the complexing agent is put into a reactor including an aqueous solution containing the complexing agent and the pH adjusting agent at a set or predetermined feed rate, and concurrently (e.g., simultaneously) the pH of the aqueous solution is controlled to form and grow a precursor seed. In the first step, the growth rate of precursor particles may be about 0.32±0.05 μm/hr. In the first step, the stirring power of the reaction mixture may be about 4 kW/m$^3$ to about 6 kW/m$^3$, for example 5 kW/m$^3$, and the pH may be about 11 to about 12. For example, in the first step, the feed rate of the metal raw material is about 1.0 L/hr to about 10.0 L/hr, for example, 5.1 L/hr, and the feed rate of the complexing agent is about 0.1 times to about 0.6 times, or about 0.3 times to about 0.6 times, for example, 0.45 times the molar feed rate of the metal raw material. The temperature of the reaction mixture is about 40° C. to about 60° C., for example, 50° C., and the pH of the reaction mixture is about 11.20 to about 11.70, for example about 11.3 to 11.5.

In the second step, the precursor seed formed in the first step is grown by changing the reaction conditions. The growth rate of the precursor seed in the second step is equal to the growth rate of the precursor seed in the first step or is increased by 20% or more. The feed rate of the metal raw material in the second step is 1.1 times or more, for example, about 1.1 times to about 1.5 times as compared with the feed rate of the metal raw material in the first step, and the concentration of the complexing agent in the reaction mixture may be increased by 0.05 M or more, for example, about 0.05 M to about 0.15 M based on the concentration of the complexing agent in the first step (S1). In the second step, the stirring power of the reaction mixture may be 1 kW/m$^2$ or more and less than 4 kW/m$^3$, for example, 3 kW/m$^3$, and the pH thereof may be about 10.5 to about 11. The average particle diameter D50 of the precursor particles obtained in the second step may be about 9 μm to about 12 μm, for example, about 10 μm.

In the third step, the growth rate of the precursor particles is adjusted to obtain a nickel-based active material precursor for a lithium secondary battery. When the average particle diameter D50 of the precursor particles in the second step reaches about 9 μm to about 12 μm, for example, about 10 μm, the third step proceeds. The growth rate of the precursor particles in the third step may be increased by 2 times or more, for example, three times or more, as compared with the growth rate of the precursor particles in the second step. For this purpose, a part of the reaction product in the reactor through the second step may be removed to dilute the concentration of the reaction product in the reactor. The reaction product removed from the reactor may be used in another reactor. The feed rate of the metal raw material in the third step may be 1.1 times or more, for example, about 1.1 times to about 1.5 times as compared with the feed rate of the metal raw material in the second step, and the concentration of the complexing agent in the reaction mixture may be increased by 0.05 M or more, for example, about 0.05 M to about 0.15 M based on the concentration of the complexing agent in the second step. In the third step, a precipitate rapidly grows to obtain a nickel-based active material precursor. The stirring power of the reaction mixture in the third step may be 0.5 kW/m$^3$ or more and less than 1 kW/m$^3$, for example, 0.8 kW/m$^3$, and the pH thereof may be about 10 to about 10.5.

In the method of preparing the precursor, the feed rate of the metal raw material is sequentially increased in order of the first step, the second step, and the third step. For example, the feed rate of the metal raw material in the second step may be increased by about 10% to about 50% based on the feed rate of the metal raw material in the first step, and the feed rate of the metal raw material in the thirds step may be increased by about 10% to about 50% based on the feed rate of the metal raw material in the second step. As such, the feed rate of the metal raw material may be gradually increased, thereby obtaining a nickel-based active material precursor that more closely matches the aforementioned structure.

In the method of preparing the precursor, the stirring power (e.g., stirring speed) of the reaction mixture in the reactor may be sequentially decreased in order of the first step, the second step, and the third step. As such, the stirring power (e.g., stirring speed) of the reaction mixture may be gradually decreased, thereby obtaining a nickel-based active material precursor that more closely matches the aforementioned structure.

In the method of preparing the precursor, the stirring power of the reaction mixture in the reactor may be sequentially decreased in order of the first step, the second step, and the third step. The stirring power in the first step may be about 4 kW/m$^3$ to about 6 kW/m$^3$, the stirring power in the second step may be 1 kW/m$^3$ or more and less than 4 kW/m$^3$, and the stirring power in the third step may be 0.5 kW/m$^3$ or more and less than 1 kW/m$^3$. As such, the stirring power of the reaction mixture may be gradually decreased, thereby obtaining a nickel-based active material precursor that more closely matches the aforementioned structure.

In the method of preparing the precursor, the pH of the reaction mixture in the reactor may be sequentially decreased in order of the first step, the second step, and the third step. For example, the pH of the reaction mixture in the first step, the second step, and the third step may be in a range of about 10.10 to about 11.50 when the reaction temperature is 50° C. For example, the pH of the reaction mixture in the thirds step may be lowered by about 1.1 to about 1.4, or about 1.2 to about 1.4 as compared with the pH of the reaction mixture in the first step when the reaction temperature is 50° C. For example, the pH of the reaction mixture in the second step may be lowered by about 0.55 to about 0.85 as compared with the pH of the reaction mixture in the first step at a reaction temperature of 50° C., and the pH of the reaction mixture in the third step may be lowered by about 0.35 to about 0.55 as compared with the pH of the reaction mixture in the second step (S2) at a reaction temperature of 50° C. As such, the pH of the reaction mixture may be gradually decreased, thereby obtaining a nickel-based active material precursor that more closely matches the aforementioned structure.

In the method of preparing the precursor, the concentration of the complexing agent included in the reaction temperature in the second step may be increased as compared with the concentration of the complexing agent included in the reaction temperature in the first step (S1), and the concentration of the complexing agent included in the reaction temperature in the thirds step may be increased as compared with the concentration of the complexing agent included in the reaction temperature in the second step.

The feed rate of the metal raw material for growing the nickel-based active material precursor particles to control the growth rate of the precursor particles in the second step may be increased by about 15% to about 35%, for example, about 25%, as compared with the feed rate thereof in the first step, and the feed rate thereof in the third step may be increased by about 20% to about 35%, for example, about 33%, as compared with the feed rate thereof in the second step. Further, the feed rate of the complexing agent such as aqueous ammonia in the second step may be increased by about 10% to about 35%, for example, about 20% based on the feed rate of the complexing agent such as aqueous ammonia in the first step to increase the density of particles.

Considering the composition of the nickel-based active material precursor, a metal precursor may be used as the metal raw material. Examples of the metal raw material may include, but are limited to, metal carbonate, metal sulfate, metal nitrate, and metal chloride. Any suitable metal precursor used in the art may be used.

The pH adjusting agent acts to lower the solubility of metal ions in the reactor to precipitate metal ions into hydroxides. Examples of the pH adjusting agent may include sodium hydroxide (NaOH), and sodium carbonate ($Na_2CO_3$). The pH adjusting agent is, for example, sodium hydroxide (NaOH).

The complexing agent acts to control the reaction rate in formation of a precipitate in a coprecipitation reaction. Examples of the complexing agent may include ammonium hydroxide ($NH_4OH$) (aqueous ammonia), citric acid, acrylic acid, tartaric acid, and glycolic acid. The content (amount) of complexing agent may be any suitable level generally used in the art. The complexing agent is, for example, aqueous ammonia.

A nickel-based active material according to another embodiment is obtained from the aforementioned nickel-based active material precursor. The nickel-based active material is, for example, a compound represented by Formula 2 below.

$$Li_a(Ni_{1-x-y-z}Co_xMn_yM_z)O_2 \quad \text{Formula 2}$$

In Formula 2, M is an element selected from boron (B), magnesium (Mg), calcium (Ca), strontium (Sr), barium (Ba), titanium (Ti), tungsten (W), vanadium (V), chromium (Cr), iron (Fe), copper (Cu), zirconium (Zr), and aluminum (Al), $1.0 \leq a \leq 1.3$ is satisfied, and $x \leq (1-x-y-z)$, $y \leq (1-x-y-z)$, $z \leq (1-x-y-z)$, $0 < x < 1$, $0 \leq y < 1$, $0 \leq z < 1$, and $0 < 1-x-y-z < 1$ are satisfied.

In the compound represented by Formula 2, the content (amount) of nickel is higher than the content (amount) of cobalt, and the content (amount) of nickel is higher than the content (amount) of manganese. In Formula 2, $1.0 \leq a \leq 1.3$ and $0 < x \leq 1/3$ may be satisfied, and $0 \leq y \leq 0.5$, $0 \leq z \leq 0.05$, and $1/3 \leq (1-x-y-z) \leq 0.95$ may be satisfied.

In Formula 2, a may be about 1 to about 1.1, x may be about 0.1 to about 0.3, y may be about 0.05 to about 0.3, and z may be 0.

In the nickel-based active material, the content (amount) of nickel may be about 33 mol % to about 95 mol %, for example, about 50 mol % to about 90 mol %, for example, about 60 mol % to about 85 mol %, based on the total content (amount) of transition metals. The total content (amount) of transition metals indicates the total content (amount) of nickel, cobalt, manganese and M in Formula 2.

Examples of the nickel-based active material may include $LiNi_{0.6}Co_{0.2}Mn_{0.2}O_2$, $LiNi_{0.7}Co_{0.15}Mn_{0.15}O_2$, $LiNi_{07}Co_{0.1}Mn_{0.2}O_2$, $LiNi_{0.5}Co_{0.2}Mn_{0.3}O_2$, $LiNi_{1/3}Co_{1/3}Mn_{1/3}O_2$, $LiNi_{0.8}Co_{0.1}Mn_{0.1}O_2$, and $LiNi_{0.85}Co_{0.1}Al_{0.05}O_2$.

The nickel-based active material may have a similar/same particle structure and characteristics to/as the aforementioned nickel-based active material precursor, except that lithium ions are arranged in a crystal structure in the nickel-based active material and hydroxides of the nickel-based active material precursor are changed to oxides.

Because the secondary particle included in the nickel-based active material has multiple centers and includes a plurality of particulate structures arranged in an isotropic array, the movement distance of lithium ions and electrons from the surface of the secondary particle and the center of the secondary particle is reduced, so that the intercalation and desorption of lithium ions are easy, and the transmission of electrons is easy (e.g., improved). Further, because the particulate structure included in the nickel-based active material includes a porous core portion and primary particles radially arranged on the porous core portion, the volume of the nickel-based active material is effectively accommodated during charging and discharging, and thus, the stress of the nickel-based active material may be reduced. Accordingly the nickel-based active material obtained from the aforementioned nickel-based active material precursor has better capacity characteristics with respect to the same composition even when the content (amount) of nickel is not increased.

Figure 4A:
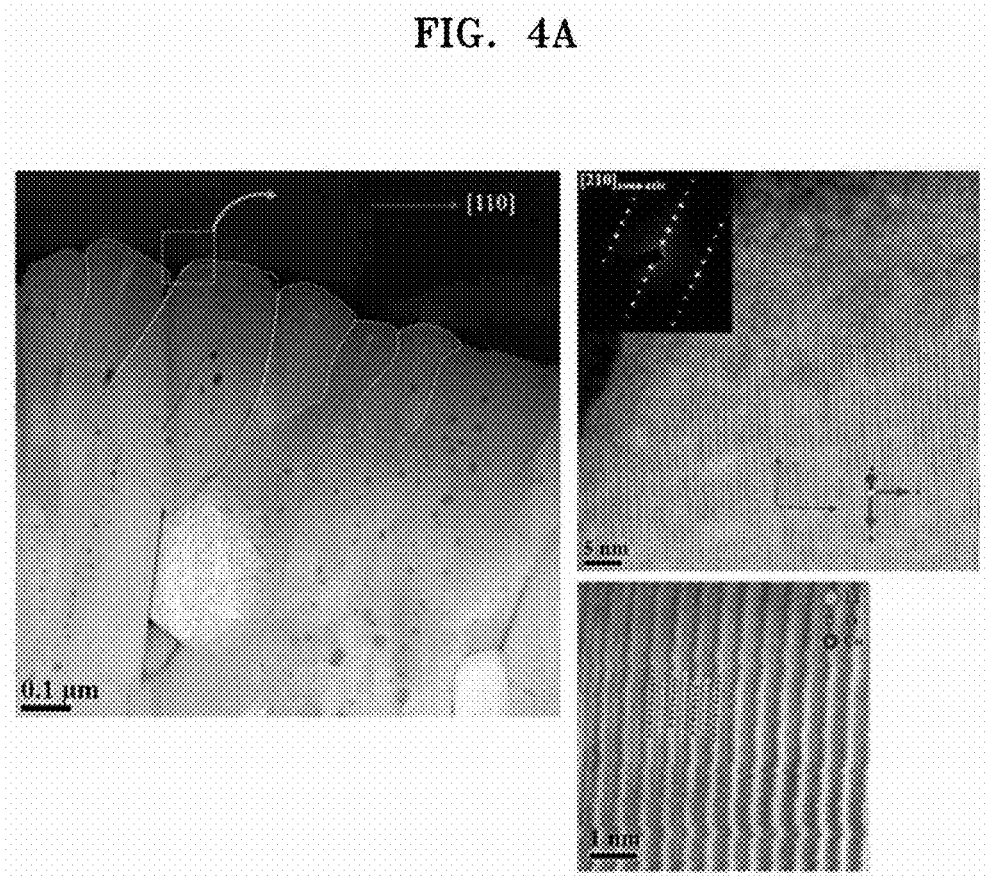
FIGS. 4A and 4B are high-resolution transmission electron microscopy (TEM) images of cross-sections of the surface and vicinity thereof of the nickel-based active material prepared in Example 1.
Figure 4B:
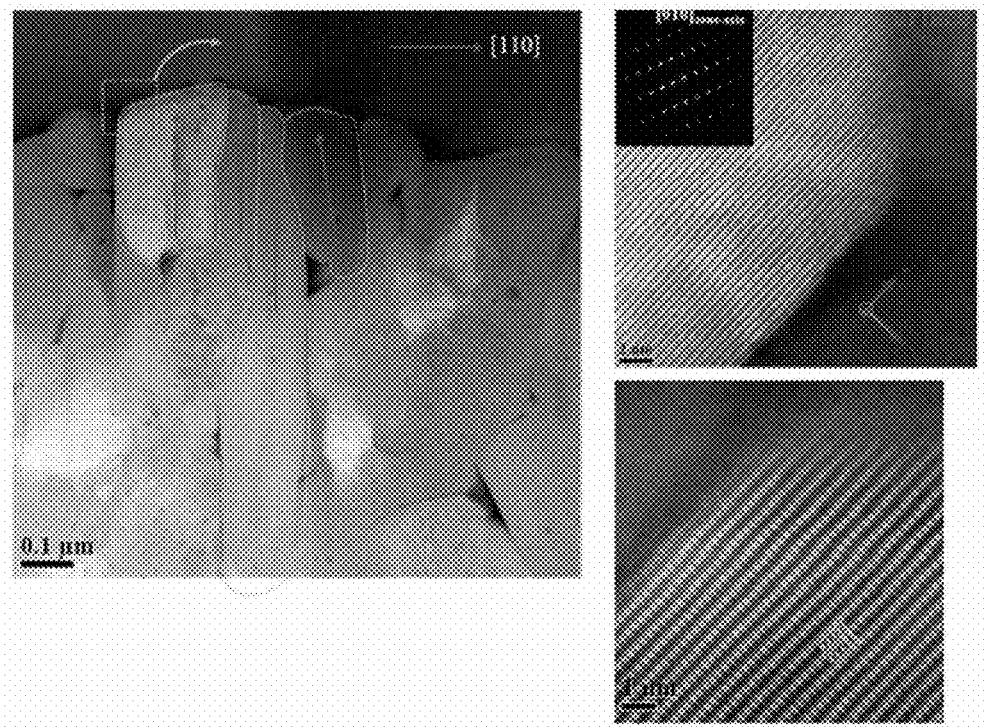

The nickel-based active material includes a secondary particle including a plurality of particulate structures, and each of the particulate structure includes a porous core portion and a shell portion including primary particles radially arranged on the porous core portion. In 50% or more of the primary particles constituting the surface of the secondary particle, a major axis of each of the primary particles is aligned along the normal direction of the surface of the secondary particle. For example, in 60% to 80% of the primary particles constituting the surface of the secondary particle, the major axis of each of the primary particles is aligned along the normal direction of the surface of the secondary particle. Referring to FIGS. 4A and 4B, in 50% or more of the primary particles constituting the surface of the secondary particle, the major axis of each of the primary particles is aligned along the normal direction of the surface of the secondary particle. In other words, in 50% or more of the primary particles constituting the surface of the secondary particle 200, the direction of the major axis of each of the primary particles is arranged along the direction [110] (e.g., a direction perpendicular (e.g., substantially perpendicular) to the (110) crystal plane of the respective plate particles).

Referring to FIGS. 4A and 4B, in 60% to 80% of the primary particles constituting the surface of the secondary particle, the major axis of each of the primary particles is aligned along the normal direction of the surface of the secondary particle. In other words, in 60% to 80% of the primary particles constituting the surface of the secondary particle 200, the direction of the major axis of each of the primary particles is aligned along the direction [110] (e.g., a direction perpendicular (e.g., substantially perpendicular) to the (110) crystal plane of the respective plate particles). The (110) crystal plane of the primary particle 30 is a crystal plane where lithium ions are injected into and discharged from the nickel-based active material. When the major axis of the primary particle at the outermost of the secondary particle is aligned along the normal direction of the surface of the secondary particle, the diffusion of lithium on the interface between the nickel-based active material and the electrolyte is easy (e.g., improved). The intercalation and desorption of lithium in the nickel-based active material is easy (e.g., improved), and the diffusion distance of lithium ions is reduced. The primary particle included in the nickel-based active material includes a plate particle, the major axis of the plate particle is aligned along the normal direction of the surface of the secondary particle, and the ratio of the thickness to the length (e.g., surface length) of the plate particle may be about 1:2 to about 1:20.

The method of preparing the nickel-based active material from the nickel-based active material precursor is not limited, and may be, for example, a dry method.

The nickel-based active material may be prepared by mixing a lithium precursor and the nickel-based active material precursor at a set or predetermined molar ratio and primarily heat-treating (e.g., low-temperature heat-treating) the mixture at about 600° C. to about 800° C.

As the lithium precursor, for example, lithium hydroxide, lithium fluoride, lithium carbonate, or a mixture thereof is used. The mixing ratio of the lithium precursor to the nickel-based active material precursor is stoichiometrically adjusted such that the nickel-based active material of Formula 2 is prepared.

The mixing of the lithium precursor and the nickel-based active material precursor may be dry mixing, and may be carried out using a mixer. The dry mixing may be carried out using milling. The conditions of milling are not limited, but the milling may be carried out such that the precursor used as a starting material is hardly deformed (for example, pulverized). The size of the lithium precursor mixed with the nickel-based active material precursor may be previously controlled. The size (average particle diameter) of the lithium precursor is in a range of about 5 μm to about 15 μm, for example, about 10 μm. The milling of the lithium precursor having such a size and the nickel-based active material precursor is carried out at a rotation speed of about 300 rpm to 3,000 rpm to obtain a desired mixture. When the temperature in the mixer increases to 30° C. or higher during a milling process, a cooling process may be performed to maintain the temperature in the mixer at room temperature (25° C.).

The low-temperature heat treatment is carried out under an oxidation gas atmosphere. In the oxidation gas atmosphere, oxidation gas such as oxygen or air is used. For example, the oxidation gas includes about 10 vol % to about 20 vol % of oxygen or air and about 80 vol % to about 90 vol % of inert gas. The low-temperature heat treatment may be carried out at a temperature below the densification temperature as the reaction of the lithium precursor and the nickel-based active material precursor proceeds. The densification temperature is a temperature at which suitable or sufficient crystallization may be achieved to realize a charging capacity that the active material may provide. The low-temperature heat treatment may be carried out at about 600° C. to about 800° C., for example, about 650° C. to about 800° C. The low-temperature heat treatment time varies depending on the heat treatment temperature and the like, but is, for example, about 3 hours to about 10 hours.

The method of preparing the nickel-based active material may further include a secondary heat treatment (e.g., high-temperature heat treatment) at oxidizing gas atmosphere while the vent is blocked after the low-temperature heat treatment and which is performed under an oxidation gas atmosphere. The high-temperature heat treatment is carried out, for example, at about 700° C. to about 900° C. The high-temperature heat treatment time varies depending on the heat treatment temperature and the like, but is, for example, about 3 hours to about 10 hours.

A lithium secondary battery according to another embodiment includes a cathode including the aforementioned nickel-based active material, an anode, and an electrolyte between the cathode and the anode.

The method of manufacturing the lithium secondary battery is not particularly limited, and any suitable method used in the art may be used. The lithium secondary battery may be manufactured by the following method.

The cathode and the anode may be fabricated by applying a composition for forming a cathode active material layer and a composition for forming an anode active material layer onto current collectors and drying these applied compositions, respectively.

The composition for forming a cathode active material layer may be prepared by mixing a cathode active material, a binder and a solvent. As the cathode active material, a cathode active material according to an embodiment is used.

The binder is a component that assists the binding of an active material and a conductive agent and the binding to the current collector, and is added in an amount of about 1 part by weight to about 50 parts by weight based on 100 parts by weight of the total weight of the cathode active material. Non-limiting examples of the binder may include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various suitable copolymers.

The conductive agent may be added in an amount of about 0.5 part by weight to about 50 parts by weight of 100 parts by weight of a total amount of the positive active material. The conductive agent is not particularly limited as long as it does not cause an undesirable chemical change in a component of the corresponding battery and has conductivity (e.g., electrical conductivity). Examples of the conductive agent may include graphite such as natural graphite or artificial graphite; carbon-based materials such as carbon black, acetylene black, ketjen black, channel black, furnace black, lamp black, and thermal black; conductive fiber such as carbon fiber or metal fiber; carbon fluoride powder; metal powder such as aluminum powder, or nickel powder; conductive whiskers such as zinc oxide whiskers or potassium titanate whiskers; conductive metal oxide such as titanium oxide; and conductive polymers such as polyphenylene derivatives.

The amount of the solvent is about 10 part by weight to about 300 parts by weight with respect to 100 parts by weight of the total weight of the positive active material. When the amount of the solvent is within the foregoing range, formation of a positive active material layer may be more facilitated. A non-limiting example of the solvent may include N-methylpyrrolidone.

The amount of the binder, the conductive agent and the solvent may be at any suitable level generally used in the art.

The cathode current collector is not limited as long as it has a thickness of about 3 μm to about 500 μm and has high conductivity (e.g., electrical conductivity) without causing an undesirable chemical change in a component of the corresponding battery. For example, the cathode current collector may include stainless steel, aluminum, nickel, titanium, or fired carbon, or may include aluminum or stainless steel surface-treated with carbon, nickel, titanium or silver. The cathode current collector may form fine irregularities on its surface to increase the adhesive force of the cathode active material, and may have various suitable forms such as film, sheet, foil, net, porous body, foam, and nonwoven fabric.

Separately, an anode active material, a binder, a conductive agent, and a solvent are mixed to prepare the composition for forming an anode active material layer. As the anode active material, a material capable of absorbing and discharging lithium ions is used. Non-limiting examples of the anode active material may include carbon-based materials such as graphite, a lithium metal and an alloy thereof, and a silicon oxide-based material.

The binder is added in an amount of about 0.5 parts by weight to about 50 parts by weight based on 100 parts by weight of the total weight of the anode active material. Non-limiting examples of the binder in the anode may be the same as those of the binder in the cathode.

The conductive agent is used in an amount of about 0.5 parts by weight to about 5 parts by weight based on 100 parts by weight of the total weight of the anode active material. When the content (amount) of the conductive agent is within the foregoing range, the conductivity (e.g., electrical conductivity) of the finally obtained electrode is good. For example, the conductive agent may be omitted in the negative active material layer when a graphite having a good conductivity (e.g., electrical conductivity) is used as an anode active material.

The solvent may be used in an amount of about 10 part by weight to about 300 parts by weight based on 100 parts by weight of the total weight of the anode active material. When the content (amount) of the solvent is within the foregoing range, the work for forming the anode active material layer is easy. As a non-limiting example of the solvent, water, N-methylpyrrolidone and/or the like may be used.

As the conductive agent and the solvent, the same kind of materials as in the fabrication of the cathode may be used.

The anode current collector is generally made to have a thickness of about 3 μm to about 500 μm. This anode current collector is not limited as long as it has high conductivity (e.g., electrical conductivity) without causing an undesirable chemical change in a component of the corresponding battery. For example, the anode current collector may include copper, stainless steel, aluminum, nickel, titanium, or fired carbon, may include copper or stainless steel surface-treated with carbon, nickel, titanium or silver, or may include an aluminum-cadmium alloy. Similarly to the cathode current collector, the anode current collector may form fine irregularities on its surface to increase the adhesive force of the anode active material, and may have various suitable forms such as film, sheet, foil, net, porous body, foam, and nonwoven fabric.

A separator is interposed between the cathode and anode fabricated in this way.

Generally, the separator has a pore diameter of about 0.01 μm to about 10 μm and a thickness of about 5 μm to about 300 μm. In an example, as the separator, a sheet or nonwoven fabric made of an olefin-based polymer such as polypropylene or polyethylene, or glass fiber is used. When a solid electrolyte such as a polymer is used as the electrolyte, the solid electrolyte may also act as a separator.

The non-aqueous electrolyte containing a lithium salt includes a non-aqueous electrolyte and a lithium salt. As the electrolyte, a non-aqueous electrolyte, an organic solid electrolyte, or an inorganic solid electrolyte may be used.

Non-limiting examples of the non-aqueous electrolytic solvent may include aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxyethane, 2-methyl tetrahydrofuran, dimethyl sulfoxide, 1,3-dioxolane, formamide, N, N-dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate, and ethyl propionate.

Non-limiting examples of the organic solid electrolyte may include polyethylene derivatives, polyethylene oxide derivatives, polypropylene oxide derivatives, phosphate ester polymers, polyester sulfide, polyvinyl alcohols, and polyvinylidene fluoride. Non-limiting examples of the inorganic solid electrolyte may include $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material easily soluble in the non-aqueous electrolyte, and non-limiting examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, $(FSO_2)_2NLi$, lithium chloroborate, lower aliphatic carboxylic acid lithium, lithium tetraphenylborate and lithium imide.

Figure 5:
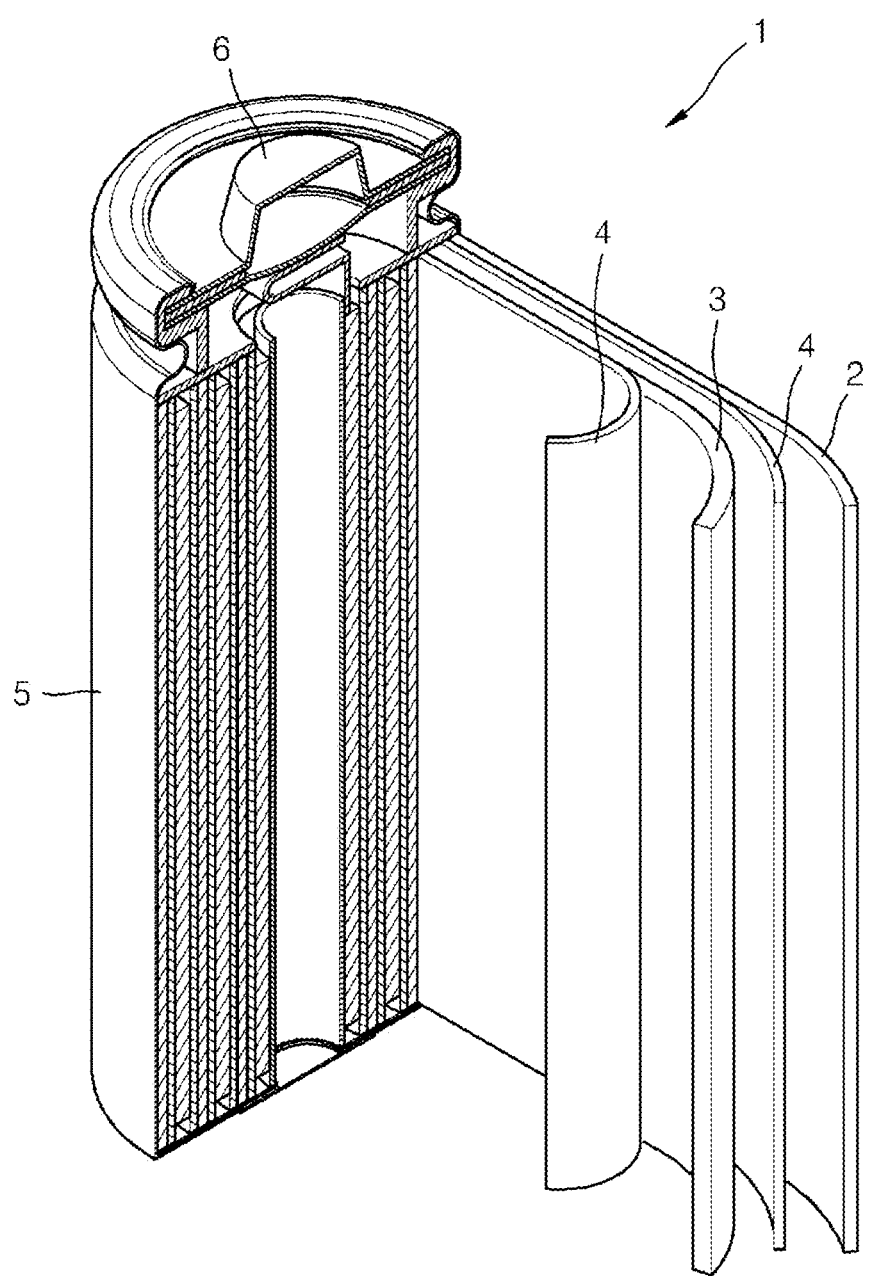
FIG. 5 is a schematic view of a lithium secondary battery according an example embodiment.

FIG. 5 is a schematic view of a lithium secondary battery according an embodiment. Referring to FIG. 5, the lithium secondary battery 1 includes a cathode 3, an anode 2, and a separator 4. The anode 3, the cathode 2, and the separator 4 are wound or folded and accommodated in a battery case 5. Then, an organic electrolyte is injected into the battery case 5, and the battery case 5 is sealed with a cap assembly 6 to complete the lithium secondary battery 1. The battery case 5 may have a cylindrical shape, a rectangular shape, or a thin film shape. For example, the lithium secondary battery 1 may be a large-sized thin-film battery. The lithium secondary battery 1 may be a lithium ion battery.

The separator may be located between the anode and the cathode to form a battery structure. The battery structure is laminated as a bi-cell structure and then impregnated with an organic electrolyte, and the resulting product is accommodated in a pouch and sealed to complete a lithium ion polymer battery. Further, the plurality of battery structures are laminated to form a battery pack, and this battery pack may be used in all suitable appliances requiring high capacity and high power. For example, the battery pack may be used in notebooks, smart phones, electric vehicles, and the like. Further, because the lithium secondary battery has good storage stability, lifetime characteristics, and high-rate characteristics at high temperatures, it may be used in electric vehicles (EV). For example, the lithium secondary battery may be used in hybrid vehicles such as plug-in hybrid electric vehicles (PHEV).

Hereinafter, the subject matter of the present disclosure will be described in more detail with reference to Examples and Comparative Examples. However, these Examples are for illustrating features of the present disclosure, and the scope of the present disclosure is not limited thereto.

Preparation Example 1: Preparation of Nickel-Based Active Material Precursor (6:2:2): Three Step Method A nickel-based active material precursor ($Ni_{0.6}Co_{0.2}Mn_{0.2}(OH)_2$) may be synthesized by a coprecipitation method. Nickel sulfate ($NiSO_4.6H_2O$), cobalt sulfate ($CoSO_4.7H_2O$), and manganese sulfate ($MnSO_4.H_2O$), as metal raw materials for forming a nickel-based active material precursor in the following preparation process, were dissolved in distilled water as a solvent to a molar ratio of Ni:Co:Mn=6:2:2 to prepare a mixed solution. Further, aqueous ammonia ($NH_4OH$) and sodium hydroxide (NaOH) as a precipitant were prepared for forming a complex compound.

First Step: Feed Rate 5.10 L/Hr, Stirring Power 5.0 kW/m³, $NH_3$—$H_2O$ 0.5 M, pH 11.30 to 11.50

Aqueous ammonia having a concentration of 0.5 mol/L (M) was put into a reactor provided with a stirrer. 2 mol/L (M) of the metal raw materials (mixed solution of nickel sulfate, cobalt sulfate, and manganese sulfate) were supplied at a feed rate of 5.10 L/hr and 0.5 mol/L (M) of aqueous ammonia was supplied at a feed rate of 0.77 L/hr while maintaining stirring power at 5.0 kW/m³ and maintaining reaction temperature at 50° C. Then, sodium hydroxide (NaOH) was supplied to maintain pH. The pH of the reaction mixture in the reactor was maintained at 11.30 to 11.50. Stirring was carried out in this pH range for 6 hours to carry out a first step reaction.

Second Step: Feed Rate 6.38 L/Hr, Stirring Power 3.0 kW/m³, $NH_3$—$H_2O$ 0.6 M, pH 10.65 to 10.75

After the first step reaction was carried out, 2 mol/L (M) of the metal raw materials were supplied at a feed rate of 6.38 L/hr and 0.6 mol/L (M) of aqueous ammonia was supplied at a feed rate of 1.01 L/hr while reducing stirring power to 3.0 kW/m³ and maintaining reaction temperature at 50° C. Then, sodium hydroxide (NaOH) was supplied to maintain pH. The pH of the reaction mixture in the reactor was maintained at 10.65 to 10.75. Stirring was carried out until the average particle diameter D50 of particles in the reactor reached about 10 μm to carry out a second step reaction. Then, a part of the product obtained in the second step reaction was removed from the reactor to reduce the concentration of the product.

Third Step: Feed Rate 8.50 L/Hr, Stirring Power 0.8 kW/m³, $NH_3$—$H_2O$ 0.7 M, pH 10.10 to 10.20

After the second step reaction was carried out, when the average particle diameter D50 of particles in the reactor reached about 10 μm, the stirring power was reduced to 0.8 kW/m³, 2 mol/L (M) of the metal raw materials were supplied at a feed rate of 8.50 L/hr, 0.7 mol/L (M) of aqueous ammonia was supplied at a feed rate of 1.18 L/hr while maintaining reaction temperature at 50° C., and NaOH was supplied to maintain pH. The pH of the reaction mixture in the reactor was maintained at 10.10 to 10.20. Stirring was carried out in this pH range for 6 hours to carry out a third step reaction. Then, the slurry solution in the reactor was filtered, washed with high-purity distilled water, and then dried in a hot oven for 24 hours to obtain a nickel-based active material precursor ($Ni_{0.6}Co_{0.2}Mn_{0.2}(OH)_2$).

Preparation Example 2: Preparation of Nickel-Based Active Material Precursor (7:1.5:1.5)

A nickel-based active material precursor ($Ni_{0.7}Co_{0.15}Mn_{0.15}(OH)_2$) was synthesized in substantially the same manner as in Preparation Example 1, except that a mixed solution was prepared such that a molar ratio of nickel sulfate ($NiSO_4.6H_2O$), cobalt sulfate ($CoSO_4.7H_2O$), and manganese sulfate ($MnSO_4.H_2O$), as metal raw materials, was Ni:Co:Mn=7:1.5:1.5 instead of the molar ratio of Ni:Co:Mn=6:2:2 in Preparation Example 1.

Preparation Example 3: Preparation of Nickel-Based Active Material Precursor (7:1:2)

A nickel-based active material precursor ($Ni_{0.7}Co_{0.1}Mn_{0.2}(OH)_2$) was synthesized in substantially the same manner as in Preparation Example 1, except that a mixed solution was prepared such that a molar ratio of nickel sulfate ($NiSO_4.6H_2O$), cobalt sulfate ($CoSO_4.7H_2O$), and manganese sulfate ($MnSO_4.H_2O$), as metal raw materials, was Ni:Co:Mn=7:1:2 instead of the molar ratio of Ni:Co:Mn=6:2:2 in Preparation Example 1.

Comparative Preparation Example 1: Preparation of Nickel-Based Active Material Precursor (6:2:2): One Step Method Nickel sulfate ($NiSO_4.6H_2O$), cobalt sulfate ($CoSO_4.7H_2O$), and manganese sulfate ($MnSO_4.H_2O$), as metal raw materials for forming a nickel-based active material precursor in the following comparative preparation process, were dissolved in distilled water as a solvent to a molar ratio of Ni:Co:Mn=6:2:2 to prepare a mixed solution. Further, aqueous ammonia ($NH_4OH$) and sodium hydroxide (NaOH) as a precipitant were prepared for forming a complex compound.

Aqueous ammonia having a concentration of 0.35 mol/L (M) was put into a reactor provided with a stirrer. Further, 2 mol/L (M) of the metal raw materials were supplied at a feed rate of 6.00 L/hr and concurrently (e.g., simultaneously) 0.35 mol/L (M) of aqueous ammonia was supplied at a feed rate of 0.6 L/hr while maintaining stirring speed at 250 rpm and maintaining reaction temperature at 50° C. NaOH was supplied to maintain pH. The pH of the reaction mixture in the reactor was maintained at 11.3 to 11.4. When the reaction was in a steady state after stirring for 33 hours within the foregoing pH range, an overflowing reaction product was collected. The collected reaction product was washed and then dried by hot air at 150° C. for 24 hours to prepare a nickel-based active material precursor ($Ni_{0.6}Co_{0.2}Mn_{0.2}(OH)_2$).

Comparative Preparation Example 2: Preparation of Nickel-Based Active Material Precursor (7:1.5:1.5)

A nickel-based active material precursor ($Ni_{0.7}Co_{0.15}Mn_{0.15}(OH)_2$) was synthesized in substantially the same manner as in Comparative Preparation Example 1, except that a mixed solution was prepared such that a molar ratio of nickel sulfate (NiSO$_4$.6H$_2$O), cobalt sulfate (CoSO$_4$.7H$_2$O), and manganese sulfate (MnSO$_4$.H$_2$O), as metal raw materials, was Ni:Co:Mn=7:1.5:1.5 instead of the molar ratio of Ni:Co:Mn=6:2:2 in Comparative Preparation Example 1.

Comparative Preparation Example 3: Preparation of Nickel-Based Active Material Precursor (7:1:2)

A nickel-based active material precursor (Ni$_{0.7}$Co$_{0.15}$Mn$_{0.15}$(OH)$_2$) was synthesized in substantially the same manner as in Comparative Preparation Example 1, except that a mixed solution was prepared such that a molar ratio of nickel sulfate (NiSO$_4$.6H$_2$O), cobalt sulfate (CoSO$_4$.7H$_2$O), and manganese sulfate (MnSO$_4$.H$_2$O), as metal raw materials, was Ni:Co:Mn=7:1:2 instead of the molar ratio of Ni:Co:Mn=6:2:2 in Comparative Preparation Example 1.

Example 1: Preparation of Nickel-Based Active Material

Composite metal hydroxide, which is the nickel-based active material precursor prepared according to Preparation Example 1, and lithium hydroxide (LiOH) were mixed to a molar ratio of 1:1 by a dry method, and the mixture was heat-treated at 700° C. for 6 hours under an oxygen atmosphere to obtain a nickel-based active material (LiNi$_{0.6}$Co$_{0.2}$Mn$_{0.2}$O$_2$). The inside of the nickel-based active material obtained in this way had a porous structure, and the outside thereof had a radial array structure. This nickel-based active material was heat-treated at 800° C. for 6 hours under an air atmosphere to obtain a nickel-based active material (LiNi$_{0.6}$Co$_{0.2}$Mn$_{0.2}$O$_2$) including a secondary particle in which primary particle aggregates having at least two radial centers of primary particles are arranged in a multi-center isotropic array.

Example 2: Preparation of Nickel-Based Active Material

A nickel-based active material was prepared in substantially the same manner as in Example 1, except that the nickel-based active material precursor of Preparation Example 2 was used instead of the nickel-based active material precursor of Preparation Example 1.

Example 3: Preparation of Nickel-Based Active Material

A nickel-based active material was prepared in substantially the same manner as in Example 1, except that the nickel-based active material precursor of Preparation Example 3 was used instead of the nickel-based active material precursor of Preparation Example 1.

Comparative Examples 1 to 3: Preparation of Nickel-Based Active Materials

Nickel-based active materials were prepared in substantially the same manner as in Example 1, except that each of the nickel-based active material precursors of Comparative Preparation Examples 1 to 3, respectively, were used instead of the nickel-based active material precursor of Preparation Example 1.

Manufacture Example 1: Manufacture of Coin Cell

A coin cell was manufactured as follows using the nickel-based active material obtained according to Example 1 as a cathode active material.

A mixture of 96 g of the nickel-based active material (LiNi$_{0.6}$Co$_{0.2}$Mn$_{0.2}$O$_2$) obtained according to Example 1, 2 g of polyvinylene fluoride, 47 g of N-methylpyrrolidone as a solvent, and 2 g of carbon black as a conductive agent was mixed and defoamed using a mixer to prepare a uniformly (e.g., a substantially uniformly) dispersed slurry for forming a cathode active material layer.

The slurry prepared in this way was applied onto an aluminum foil using a doctor blade to be made into a thin plate, and then the thin plate was dried at 135° C. for 3 hours or more and then rolled and vacuum-dried to fabricate a cathode.

A 2032 type coin cell was manufactured using the cathode and a lithium metal counter electrode. A separator (thickness: 16 μm) made of a porous polyethylene (PE) film was interposed between the cathode and the lithium metal counter electrode, and an electrolyte was injected into the separator to manufacture the 2032 type coin cell. As the electrolyte, a solution in which 1.1 M LiPF$_6$ was dissolved in a solvent in which ethylene carbonate (EC) and ethylmethyl carbonate (EMC) were mixed to a volume ratio of 3:5 was used.

Manufacture Example 2: Manufacture of Coin Cell

A coin cell was manufactured in substantially the same manner as in Manufacture Example 1, except that the nickel-based active material of Example 2 was used instead of the nickel-based active material of Example 1.

Manufacture Example 3: Manufacture of Coin Cell

A coin cell was manufactured in substantially the same manner as in Manufacture Example 1, except that the nickel-based active material of Example 3 was used instead of the nickel-based active material of Example 1.

Comparative Manufacture Examples 1 to 3: Manufacture of Coin Cells

Coin cells were manufactured in substantially the same manner as in Manufacture Example 1, except that each of the nickel-based active materials of Comparative Examples 1 to 3 was used instead of the nickel-based active material of Example 1.

Evaluation Example 1: Analysis of Major Axis Alignment of Primary Particles Constituting Surface of Secondary Particle (Nickel-Based Active Material Precursor)

With respect to the nickel-based active material precursor particles prepared according to Preparation Examples 1 to 3 and Comparative Preparation Examples 1 to 3, the alignment of primary particles existing in the outermost of the secondary particle was analyzed. In order to analyze the alignment of the primary particles, among the total primary particles arranged on the surface of the secondary particle, the number of the primary particles whose major axes are aligned along the normal direction of the surface of the secondary particle was calculated from transmission electron microscopy (TEM) images of the cross-section of the secondary particle. Among the primary particles arranged on the surface of the secondary particle, the number and area of radially arranged primary particles were calculated from the TEM images of the cross-section of the secondary particle using the Leopard (Grain size analysis) program, the ratio of the primary particles having major axes aligned along the normal direction of the surface of the secondary particle was calculated.

The results thereof are given in Table 1 below.

TABLE 1

| Class. | Ratio (%) of primary particles having major axes aligned along normal direction of surface of secondary particle |
|---|---|
| Preparation Example 1 | 62.54 |
| Preparation Example 2 | 61.8 |
| Preparation Example 3 | 65.41 |
| Comparative Preparation Example 1 | 40.81 |
| Comparative Preparation Example 2 | 45.45 |
| Comparative Preparation Example 3 | 38.41 |

As given in Table 1, in the case of the nickel-based active material precursors of Preparation Examples 1 to 3, 50% or more of the primary particles existing in the outermost of the secondary particle (e.g., 50% or more of the primary particles arranged on the surface of the secondary particle) have major axes aligned along the normal direction of the surface of the secondary particle. In contrast, in the case of the nickel-based active material precursors of Comparative Preparation Examples 1 to 3, only 46% or less of the primary particles have major axes aligned along the normal direction of the surface of the secondary particle.

Evaluation Example 2: Analysis of Major Axis Alignment of Primary Particles Constituting Surface of Secondary Particle (Nickel-Based Active Material)

With respect to the nickel-based particles prepared according to Examples 1 to 3 and Comparative Examples 1 to 3, the alignment of primary particles existing in the outermost of the secondary particle was analyzed. In order to analyze the alignment of the primary particles, among the total primary particles constituting surface of secondary particle, the number of the primary particles whose major axes are aligned along the normal direction of the surface of the secondary particle was calculated from TEM images of the cross-section of the secondary particle. Among the primary particles arranged on the surface of the secondary particle, the number and area of radially arranged primary particles were calculated from the TEM images of the cross-section of the secondary particle using the Leopard (Grain size analysis) program, the ratio of the primary particles having major axes aligned along the normal direction of the surface of the secondary particle was calculated.

As shown in FIGS. 4A and 4B, in the case of the nickel-based active material of Example 1, 50% or more of the primary particles arranged on the surface of the secondary particle have major axes aligned along the normal direction of the surface of the secondary particle. In some embodiments, the major axis direction of the primary particles are arranged in a normal direction of the (110) crystal plane of the primary particle constituting surface of the secondary particle, and the major axes of the primary particles are aligned along the normal direction of the surface of the secondary particle. In other words, in the primary particles constituting surface of the secondary particle, the direction of the major axis of each of the primary particles is aligned along the direction [110] (e.g., a direction perpendicular (e.g., substantially perpendicular) to the (110) crystal plane of the respective plate particles). In contrast, in the case of the nickel-based active materials of Comparative Examples 1 to 3, only 40% or less of the primary particles have major axes aligned along the normal direction of the surface of the secondary particle.

Referring to FIGS. 4A and 4B, the primary particles constituting the surface of the secondary particle are plate particles, and these plate particles are radially arranged in the direction from the surface of the particulate structure to the center thereof. Further, it was found that the particulate structure has a porous core portion.

Evaluation Example 3: Initial Charge Efficiency (I.C.E)

The coin cells manufactured according to Manufacture Examples 1 to 3 and Comparative Manufacture Examples 1 to 3 were charged and discharged once at 25° C. and 0.1 C to proceed formation. Subsequently, charging-discharging was performed once at 0.1 C to confirm initial charge-discharge characteristics. During charging, the coin cells were set such that a constant current (CC) mode starts, is converted into a constant voltage (CV) mode, and the coin cells are cut off at 4.3 V and 0.05 C. During discharging, the coin cells were set such that the coin cells are cut off at 3.0 V at the constant current (CC) mode. Initial charge efficiency (I.C.E) were measured according to Equation 1 below, and the results thereof are given in Table 2 below.

$$\text{Initial charge efficiency [\%]} = [1^{st} \text{ cycle discharge capacity}/1^{st} \text{ cycle charge capacity}] \times 100 \quad \text{Equation 1}$$

TABLE 2

| Class | Charge capacity (mAh/g) | Discharge capacity (mAh/g) | I.C.E (%) |
|---|---|---|---|
| Manufacture Example 1 | 197.8 | 190.0 | 96.0 |
| Manufacture Example 2 | 210.6 | 202.2 | 96.0 |
| Manufacture Example 3 | 206.1 | 196.8 | 95.5 |
| Comparative Manufacture Example 1 | 197.4 | 179.3 | 90.8 |
| Comparative Manufacture Example 2 | 209.4 | 190.5 | 91.0 |
| Comparative Manufacture Example 3 | 204.9 | 185.4 | 90.5 |

As given in Table 2, the initial charge efficiencies (initial characteristics) of the coin cells manufactured according to Manufacture Examples 1 to 3 were improved as compared with those of the coin cells manufactured according to Comparative Manufacture Examples 1 to 3.

When the nickel-based active material precursor for the lithium secondary battery according to an aspect of an embodiment is used, it is possible to obtain a nickel-based active material in which the diffusion of lithium on the interface between a cathode active material and an electrolyte is easy (e.g., improved), and the diffusion of lithium into the cathode active material is easy. Further, it is possible to obtain a nickel-based active material which is easy to intercalate and desorb lithium and has a short diffusion distance of lithium ions. In the lithium secondary battery manufactured using such a cathode active material, the utilization of lithium is improved, and the breakage of the active material according to charging and discharging is suppressed or reduced to increase capacity and lifetime.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope of the present disclosure as defined by the appended claims, and equivalents thereof.

What is claimed is:

1. A nickel-based active material precursor for a lithium secondary battery comprising:
    a secondary particle comprising a plurality of particulate structures, each particulate structure having a radial center,
    wherein the secondary particle comprises a plurality of radial centers,
    wherein each particulate structure comprises a plurality of primary particles,
    wherein each of the particulate structures comprises a porous core portion and a shell portion comprising primary particles radially arranged on the porous core portion, and
    wherein, in 50% or more of the primary particles constituting a surface of the secondary particle, a major axis of each of the primary particles is aligned along a normal direction of the surface of the secondary particle,
    wherein a porosity in the porous core portion are larger than the porosity in the shell portion.

2. The nickel-based active material precursor of claim 1, wherein,
    in 60% to 80% of the primary particles constituting the surface of the secondary particle, the major axis of each of the primary particles is aligned along a normal direction of the surface of the secondary particle.

3. The nickel-based active material precursor of claim 1, wherein,
    each of the primary particles comprises a plate particle,
    a major axis of the plate particle is arranged in a normal direction of the surface of the secondary particle, and
    a ratio of a thickness to a length of the plate particle is 1:2 to 1:20.

4. The nickel-based active material precursor of claim 1, wherein,
    in 50% or more of the primary particles constituting the surface of the secondary particle, a major axis of each of the primary particles is arranged along a normal direction of a (110) crystal plane of the primary particles constituting the surface of the secondary particle.

5. The nickel-based active material precursor of claim 1, wherein,
    the secondary particle comprises particulate structures arranged in a multi-center isotropic array.

6. The nickel-based active material precursor of claim 1, wherein,
the porous core portion has a pore size of about 150 nm to about 1 μm and a porosity of about 5% to about 15%, and the shell portion has a porosity of about 1% to about 5%.

7. The nickel-based active material precursor of claim 1, wherein,
the nickel-based active material precursor is a compound represented by Formula 1 below:

$$Ni_{1-x-y-z}Co_xMn_yM_z(OH)_2 \quad \text{[Formula 1]}$$

in Formula 1, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), and
$x \leq (1-x-y-z)$, $y \leq (1-x-y-z)$, $0<x<1$, $0 \leq y<1$, and $0 \leq z<1$ are satisfied.

8. The nickel-based active material precursor of claim 7, wherein,
in the nickel-based active material precursor, the amount of nickel is about 33 mol % to about 95 mol % based on a total amount of transition metals, and is higher than the amount of manganese and is higher than the amount of cobalt.

9. A nickel-based active material for a lithium secondary battery, obtained from the nickel-based active material precursor of claim 1.

10. A lithium secondary battery comprising: a cathode comprising the nickel-based active material of claim 9; an anode; and an electrolyte between the cathode and the anode.

* * * * *